United States Patent
Satterfield

(10) Patent No.: US 12,024,295 B2
(45) Date of Patent: Jul. 2, 2024

(54) DEPLOYABLE SEAT BOTTOM ASSEMBLY

(71) Applicant: Johnny A. Satterfield, Chatsworth, CA (US)

(72) Inventor: Johnny A. Satterfield, Chatsworth, CA (US)

(73) Assignee: S & S Numerical Control, Inc., Northridge, CA (US)

(*) Notice: Subject to any disclaimer, the term of this patent is extended or adjusted under 35 U.S.C. 154(b) by 88 days.

(21) Appl. No.: 17/586,642

(22) Filed: Jan. 27, 2022

(65) Prior Publication Data
US 2022/0242570 A1   Aug. 4, 2022

Related U.S. Application Data

(60) Provisional application No. 63/145,304, filed on Feb. 3, 2021.

(51) Int. Cl.
*B64D 11/06* (2006.01)

(52) U.S. Cl.
CPC .................. *B64D 11/064* (2014.12)

(58) Field of Classification Search
CPC .................................................. B64D 11/064
See application file for complete search history.

(56) References Cited

U.S. PATENT DOCUMENTS

| | | | | |
|---|---|---|---|---|
| 3,897,036 | A | * | 7/1975 | Nystrom ................. B60N 2/507 248/421 X |
| 5,022,707 | A | * | 6/1991 | Beauvais ............. B60N 2/4221 248/424 X |
| 5,593,209 | A | | 1/1997 | Bauer et al. |
| 8,585,146 | B1 | | 11/2013 | Glasson et al. |
| 2009/0174244 | A1 | | 7/2009 | York et al. |
| 2019/0152352 | A1 | | 5/2019 | Handigol et al. |

FOREIGN PATENT DOCUMENTS

| | | |
|---|---|---|
| DE | 102008053475 A1 | 4/2010 |
| DE | 102017208688 A1 | 11/2018 |
| EP | 1106422 A1 | 6/2001 |
| KR | 20200005762 A | 1/2020 |

OTHER PUBLICATIONS

ISA EPO, International Search Report and Written Opinion in counterpart PCT International Application No. PCT/US22/14413, Apr. 20, 2022.

* cited by examiner

*Primary Examiner* — Anthony D Barfield
(74) *Attorney, Agent, or Firm* — Matthew J. Spark; Stefan J. Kirchanski; Zuber Lawler LLP

(57) ABSTRACT

A seat bottom assembly, movable between stowed and deployed configurations, includes a seat pan plate having a front side, a rear side, a left side, a right side, a top surface, and a bottom surface. The seat pan plate is configured to move between stowed and deployed positions. The assembly also includes a pair of beam braces configured to engage a seat frame of a seat; a pair of front links operationally connecting the beam braces and the seat pan plate; and a pair of rear links operationally connecting the beam braces and the seat pan plate. Each of the front links is disposed on an opposite side of the seat pan plate from the other front link; and each of the rear links is disposed on an opposite side of the seat pan plate from the other rear link.

17 Claims, 10 Drawing Sheets

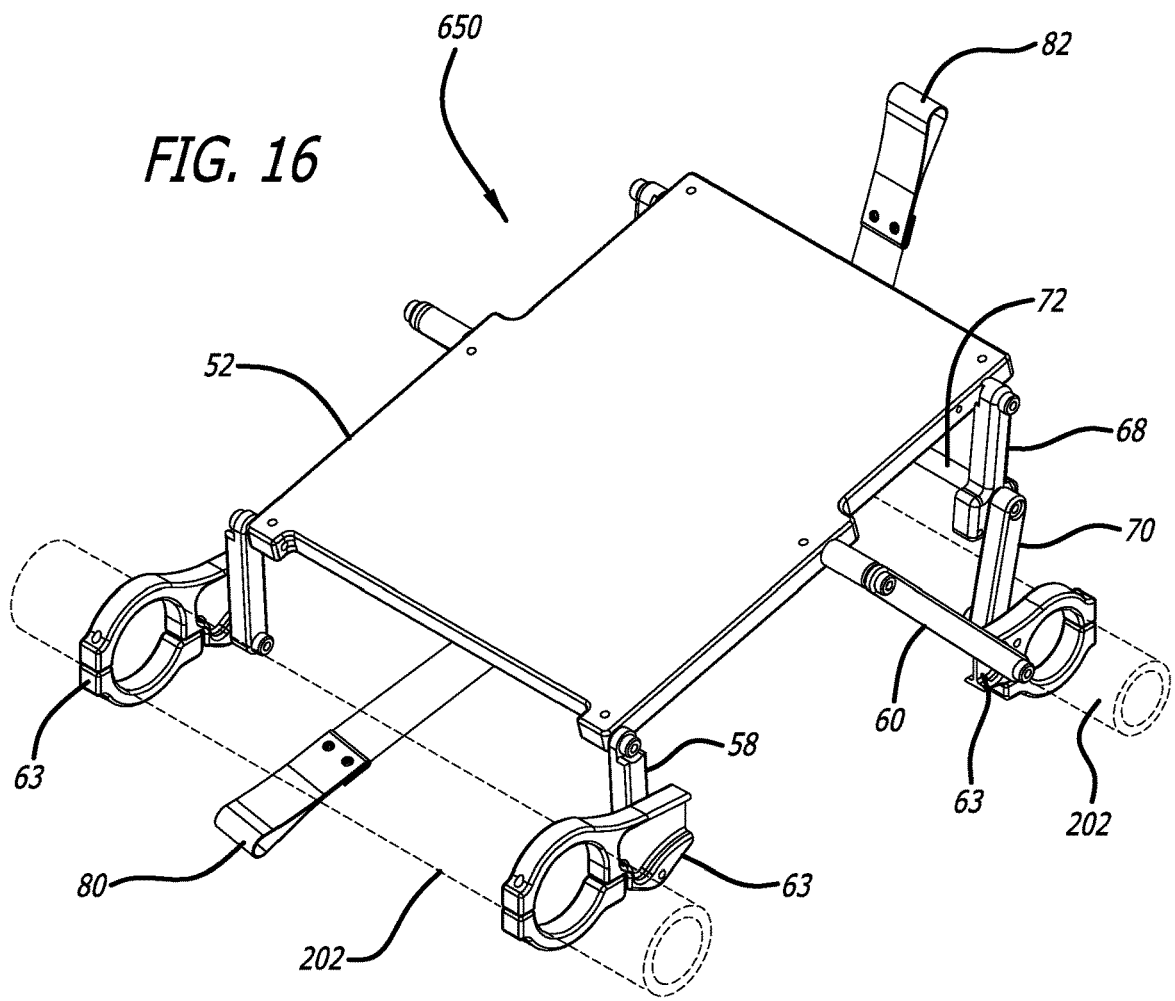

DEPLOYABLE SEAT BOTTOM ASSEMBLY

BACKGROUND

The present invention relates generally to seats. More particularly, the present invention relates to a deployable seat bottom for an aircraft seat.

Commercial airline carriers strive to provide improved services for their customers as well as improving passenger comfort and convenience. Economy class cabins in commercial passenger aircraft have a very limited amount of legroom. Airline carriers continue to add seats to aircraft but are constantly looking for ways to improve passenger comfort. Even as the number of seats increase, the size of those seats get smaller, and individual flights get more crowded, the airline carriers nonetheless want air travel to be enjoyable.

Focusing on passenger wellness is one of the ways the airline carriers do that, and it is part of the larger wellness movement underway in the travel industry. In fact, many airline carriers have instituted a dedicated "healthy flying" section on their websites to promote ways that passengers can be more comfortable during flight. While the extent of the danger is not completely settled, many believe that air travel can contribute to Deep Vein Thrombosis (DVT), especially to those who may be predisposed. Aircraft passengers are encouraged to do exercises to help prevent DVT and to promote circulation in the legs. However, due to cabin density, it can be impractical for passengers to get out of their seats during flight to stretch their legs.

Passenger egress can also be difficult from economy class seating. Seating pitch in economy classes generally range from about 28 inches to about 34 inches, depending on airline preferences. Seating pitch refers to the measurement of space between one point on an aircraft passenger seat to the same point on the seat in front of it (e.g., the distance from the headrest on one passenger seat to the headrest on the passenger seat in front of it). The higher the seating pitch, the more legroom and space a passenger has between their seat and the one in front of them. With ever decreasing seating pitch, seat cushions will either need to be smaller, or the front side of the seat cushion will get closer to the seatback in front of the seat cushion, making passenger egress more difficult.

Passengers are willing to do just about anything for relief. There have been instances of "sky rage" where passengers who are denied the extra bit of recline confront the passenger sitting behind them that have prevented the seat from reclining. Sitting in one position for hours will surely shorten tempers.

Some of the most meaningful ways economy class seats can augment passenger comfort is by increasing seating pitch, maximizing recline of the seatback, adding seat pan translation and headrest adjustability to individual passenger seats. However, even when a passenger has their seatback reclined and the seat pan forward, that passenger may still have discomfort after just a few hours because of their inability to fully extend the legs if their knees are prevented from extending and locking due to the height and angle of the seat pan. The extending and locking of the knees is crucial to stretching their legs and allowing proper circulation and comfort. Whether it is by putting their feet on the headrest in front of them, stretching their legs into the isle, or using their arms to prop themselves up in order to straighten their knees, passengers are no doubt willing to go to great lengths to get an extra few inches that can be the difference between a comfortable flight and a miserable one. The last of those efforts (i.e., using ones arms to raise themselves out of the seat) provides an opportunity to give the passenger one more feature to help provide relief in a subtle but effective way.

A fresh look needs to be taken at specific aspects of economy class seats to enhance the passenger experience. As pointed out, long periods of inactivity and an inability to stretch can be major causes of passenger discomfort. While there are exercises one can do while seated, those exercises do not always address one main source of discomfort: the inability of a passenger to stretch their legs.

Accordingly, there is a need for an improved seat bottom assembly during a flight aboard an aircraft. There is a further need for an improved seat bottom assembly movable between stowed and deployed positions. There is also a need for an improved modular seat bottom assembly. There is a need for an improved seat bottom assembly that allows passenger leg extension. There is an additional need for an improved seat bottom assembly that maximizes the use of a limited space. There is a still additional need for a seat bottom assembly that promotes blood circulation in a passenger's legs. There is a still further need for a seat bottom assembly that helps prevent DVT. There is a yet further need for a seat bottom assembly that increases space for egress. There is also a need for a seat bottom assembly that provides an option that can be used as needed to stretch legs. There is a further need for a seat bottom assembly that works with economy class seats. There is a yet further need for a seat bottom assembly that promotes "Healthy Flying". There is a yet further need for a seat bottom assembly that has minimal weight impact. There is a need for a seat bottom assembly that is adaptable to translating seat pans. There is also a need for a seat bottom assembly that can be used with new seats and retro-fitted existing seats. There is an additional need for a seat bottom assembly that is easier to manufacture, assemble, adjust, and maintain. The present invention satisfies these needs and provides other related advantages.

SUMMARY

The present invention provides an improved seat bottom assembly during a flight aboard an aircraft. The present invention provides an improved seat bottom assembly movable between stowed and deployed positions. The present invention provides an improved modular seat bottom assembly. The present invention provides passenger leg extension. The present invention maximizes use of a limited space. The present invention provides promotes blood circulation in a passenger's legs. The present invention helps prevent DVT. The present invention increases space for egress. The present invention provides an option that can be used as needed to stretch legs. The present invention works with economy class seats. The present invention promotes "Healthy Flying". The present invention provides minimal weight impact. The present invention is adaptable to translating seat pans. The present invention can be used with new seats and retro-fitted existing seats. The present invention is easier to manufacture, assemble, adjust, and maintain. The present invention satisfies these needs and provides other related advantages.

A deployable seat bottom assembly is a self-contained, standalone unit or module that is attachable to existing support beams of any economy class seat. Manual or automatic deployment activates the lift and tilt functions of the deployable seat bottom assembly to simultaneously push a seat pan of the assembly up and aft, providing additional space for egress as well additional legroom. Seat manufacturers may install their own, unique seat pans for a turnkey solution.

The deployable seat bottom assembly is a completely optional function available to passengers (i.e., passengers can choose to use it or not to use it). A passenger entering the aircraft will see no difference in the seat, and the seat cushions covering the assembly will appear exactly the same. It is an additional comfort option for those passengers who desire to use the assembly (similar to an adjustable headrest) so nothing is required of those passengers who do not want to use the assembly. For manual operation, pull tabs can be added in the front and back.

In an illustrative embodiment, a seat bottom assembly movable between stowed and deployed configurations includes a seat pan plate having a front side, a rear side, a left side, a right side, a top surface, and a bottom surface. The seat pan plate is configured to move between stowed and deployed positions. The seat bottom assembly also includes a pair of beam braces configured to engage a seat frame of a seat; a pair of front links operationally connecting the beam braces and the seat pan plate; and a pair of rear links operationally connecting the beam braces and the seat pan plate. Each of the front links is disposed on an opposite side of the seat pan plate from the other front link; and each of the rear links is disposed on an opposite side of the seat pan plate from the other rear link.

In another illustrative embodiment, each beam brace includes a beam brace retainer on each end of the beam brace, wherein each beam brace retainer is configured to engage a portion of the seat frame of the seat.

In an additional illustrative embodiment, each beam brace retainer comprises an adjustable clamp configured to engage the seat frame.

In a further illustrative embodiment, at least one of the rear links includes a stop configured to prevent movement of the link in one direction.

In still another illustrative embodiment, one of the beam braces is disposed laterally adjacent to a left side of the seat pan plate, and the other one of the beam braces is disposed laterally adjacent to a right side of the seat pan plate.

In yet another illustrative embodiment, the seat pan plate is generally angled at about −5 degrees to about 5 degrees in the stowed position, and the seat pan plate is generally pitched at about 40 degrees to about 50 degrees in the deployed position.

In a yet further illustrative embodiment, the seat bottom assembly further includes a front pull tab operationally connected to the rear links, and configured to pull the seat pan plate towards the stowed position when acted upon by a user.

In a further illustrative embodiment, the seat bottom assembly further includes a rear pull tab operationally connected to the rear side of the seat pan plate, and configured to pull the seat pan plate towards the deployed position when acted upon by a user.

In another illustrative embodiment, the seat bottom assembly further includes a biasing mechanism configured to automatically bias the seat pan plate from the stowed position to the deployed position.

In an illustrative embodiment, the seat bottom assembly further includes a pair of stabilizer links operationally connecting the beam braces and the seat pan plate; wherein each of the stabilizer links is disposed on an opposite side of the seat pan plate from the other stabilizer link.

In an additional illustrative embodiment, each rear link includes an upper link rotatably connected to a side of the seat pan plate, and a lower link rotatably connected to a side of the beam brace, wherein the upper and lower links are rotatably connected to each other at distal ends from where the upper and lower links respectively engage the seat plan plate and the beam brace, and wherein the seat bottom assembly further includes a cross bar connected the rear links and disposed therebetween. Adding to this embodiment, the distal end of at least one of the rear links includes a stop configured to prevent movement of that rear link in one direction.

In yet another illustrative embodiment, each rear link includes a rail rotatably connected to a side of the seat pan plate, and a rail guide rotatably connected to a side of the beam brace, wherein the rail slidingly engages the rail guide.

In still another illustrative embodiment, each rear link includes a first end rotatably connected to a side of the seat pan plate, and a second end configured to slidingly engage a slot in the beam brace.

In an illustrative embodiment, at least one of the rear links is configured to automatically bias the seat pan plate from the stowed position to the deployed position.

In a still further illustrative embodiment, the seat bottom assembly further includes a gas spring having first and second ends, wherein the gas spring is operationally connected to the rear links at or near the first end of the gas spring, and operationally connected to the beam braces at or near the second end of the gas spring, and wherein the gas spring is configured to automatically bias the seat pan plate from the stowed position to the deployed position.

In an illustrative embodiment, a seat assembly, includes a seat; and a seat bottom assembly movable between stowed and deployed configurations where the seat bottom assembly includes a seat pan plate having a front side, a rear side, a left side, a right side, a top surface, and a bottom surface. The seat pan plate is configured to move between stowed and deployed positions. The seat bottom assembly also includes a pair of beam braces configured to engage a seat frame of a seat; a pair of front links operationally connecting the beam braces and the seat pan plate; and a pair of rear links operationally connecting the beam braces and the seat pan plate. Each of the front links is disposed on an opposite side of the seat pan plate from the other front link; and each of the rear links is disposed on an opposite side of the seat pan plate from the other rear link.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The various present embodiments now will be discussed in detail with an emphasis on highlighting the advantageous features with reference to the drawings of various embodiments. The illustrated embodiments are intended to illustrate, but not to limit the invention. These drawings include the following figures, in which like numerals indicate like parts:

FIG. 16 illustrates a front left perspective view of a deployable seat bottom assembly in accordance with a still further illustrative embodiment of the present invention, with the deployable seat bottom assembly in a fully deployed configuration;

FIG. 17 illustrates a left elevation side view of the deployable seat bottom assembly of FIG. 16, with the deployable seat bottom assembly in a fully deployed configuration.

DETAILED DESCRIPTION

Figure 1:
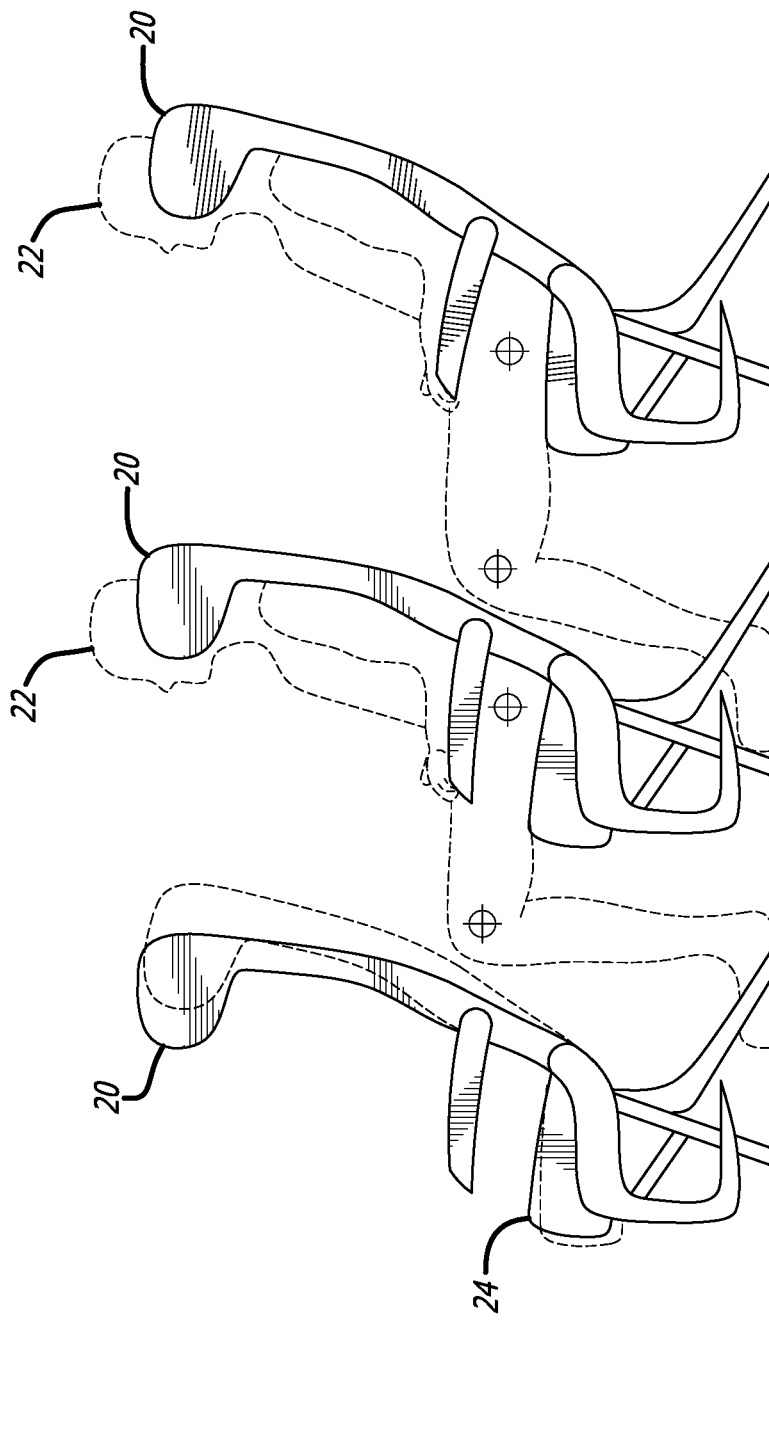
FIG. 1 illustrates a left side view of three conventional passenger seats, where each passenger seat includes a seatback capable of being reclined, with the seatback of the left passenger seat shown in upright and reclined (shown in broken lines) positions, the center seat occupied by a passenger (shown in broken lines) with the seatback in an upright position, and the right passenger seat occupied by a passenger (shown in broken lines) with the seatback in a reclined position.

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a deployable seat bottom. The following detailed description describes the present embodiments, with reference to the accompanying drawings. In the drawings, reference numbers label elements of the present embodiments. These reference numbers are reproduced below in connection with the discussion of the corresponding drawing features. It is to be understood that the figures and descriptions of the present invention have been simplified to illustrate elements that are relevant for a clear understanding of the present invention, while eliminating, for the purpose of clarity, many other elements found in paper shredders. Those of ordinary skill in the pertinent arts may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the pertinent arts.

As illustrated in FIG. 1, three (3) conventional economy class passenger seats 20 are illustrated where each passenger seat includes a seatback capable of being reclined. The seatback of the left passenger seat 20 is shown in an upright position (the reclined position shown in broken lines). The center seat 20 occupied by a passenger 22 (shown in broken lines) with the seatback in an upright position. The right passenger seat 20 is also occupied by a passenger 22 (shown in broken lines) but the seatback is in a reclined position. The position of the knees, thighs and feet of the passenger in the right seat 20 should be noted. Even if there were more pitch to the seat cushion 24, the angle and height of the seat pan (not shown) on which the seat cushion 24 is disposed and secured to, the position of the knees, thighs and feet of the passenger prevent the passenger from extending their legs. In this scenario, the passenger 22 would be forced to raise their body temporarily to lock their knees. Allowing the passenger 22 to temporarily extend their legs would provide great relief and allow proper circulation in addition to reducing the amount of stiffness typically seen on long flights. However, in the scenario shown in FIG. 1, this is not possible.

Figure 2:
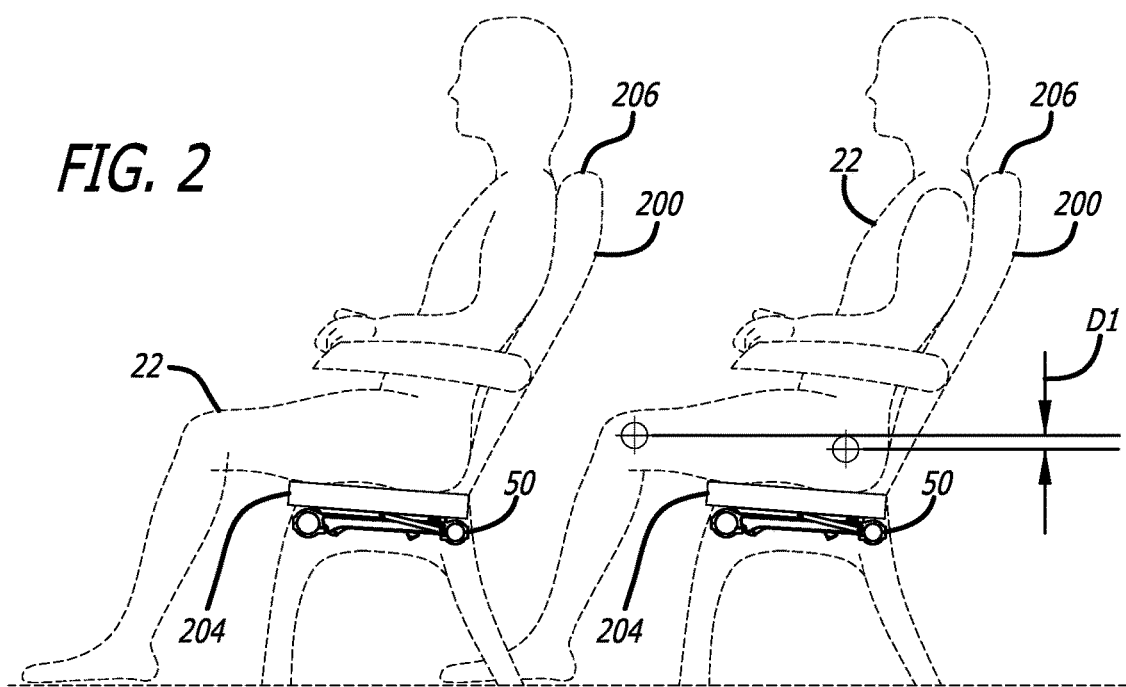
FIG. 2 illustrates a left side view of two passenger seats (seen in broken lines) with each passenger seat incorporating a deployable seat bottom assembly in accordance with an illustrative embodiment of the present invention (with each deployable seat bottom assembly in a stowed configuration), with the left and right passenger seats occupied by passengers (shown in broken lines) with each seatback in an upright position, and showing the difference (D1) in height of the passengers' hips and knees (as represented by the circles) when the deployable seat bottom assembly is in the stowed configuration.
Figure 3:
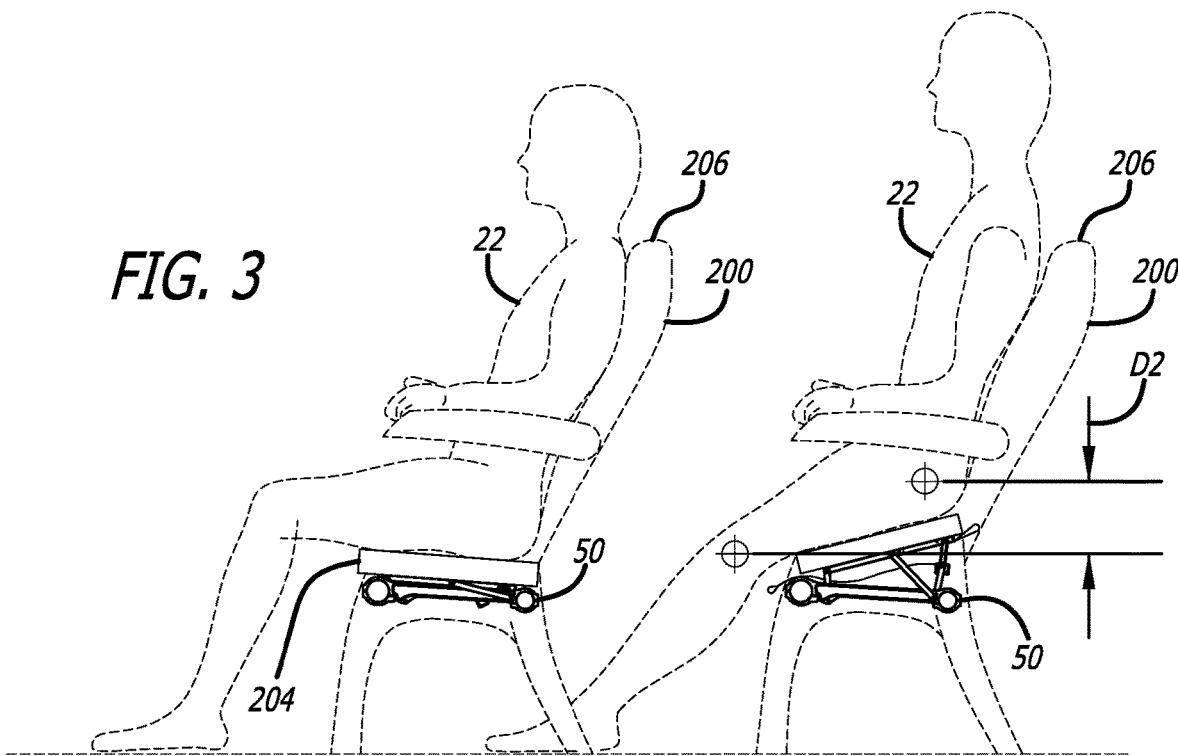
FIG. 3 illustrates a left side view of two passenger seats (seen in broken lines) incorporating the deployable seat bottom assembly of FIG. 2, with the left passenger seat occupied by a passenger (shown in broken lines) with their seatback in an upright position (with the deployable seat bottom assembly of the left passenger seat in a stowed configuration), and with the right passenger seat occupied by a passenger (shown in broken lines) with their seatback in a reclined position showing the difference (D2) in height of the right passenger's hips and knees (as represented by the circles) (with the deployable seat bottom assembly of the right passenger seat in a deployed configuration)
Figure 4:
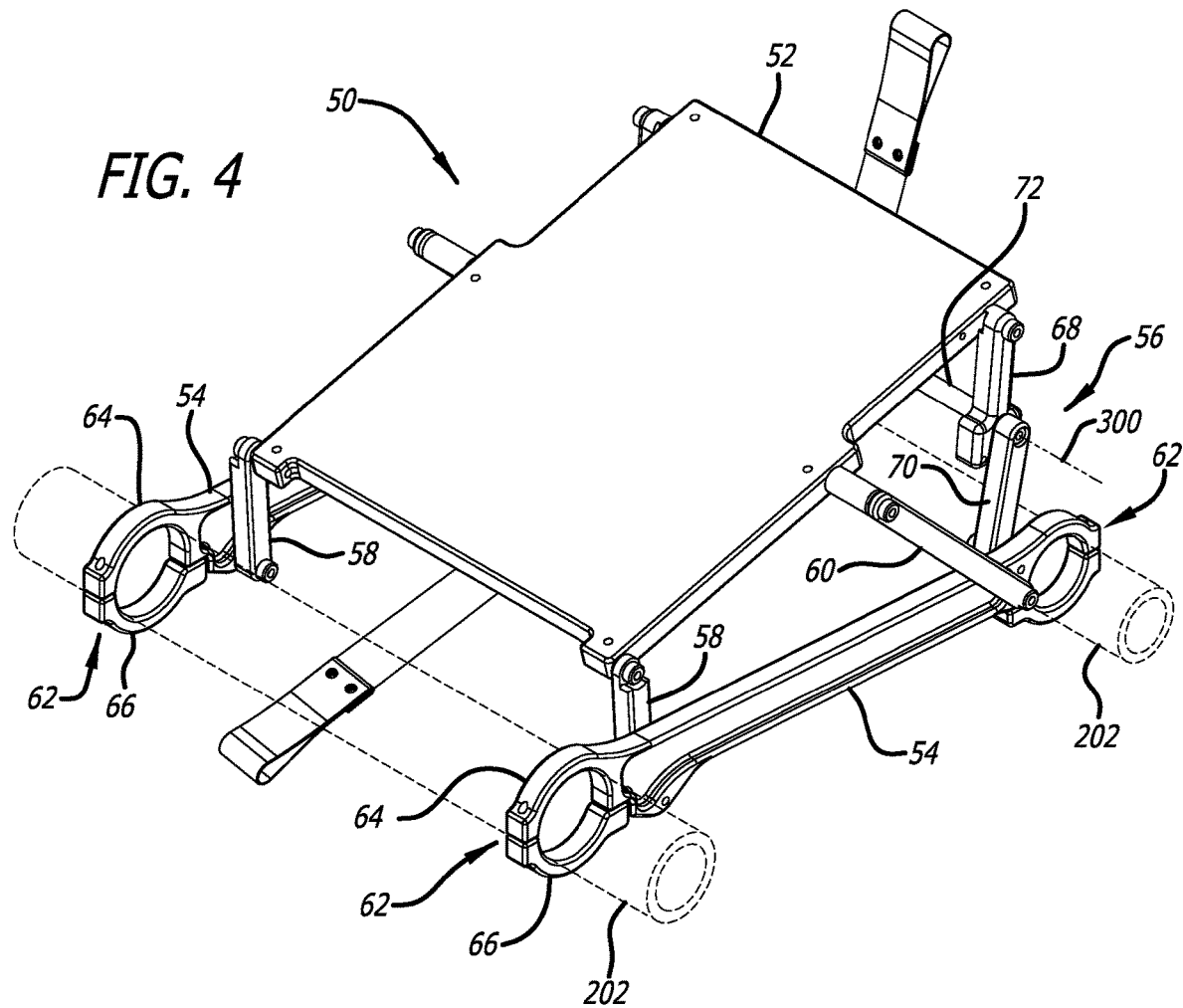
FIG. 4 illustrates a front left perspective view of the deployable seat bottom assembly of FIG. 2 with the deployable seat bottom assembly in a fully deployed configuration, and engaging structure of a passenger seat (seen in broken lines)
Figure 5:
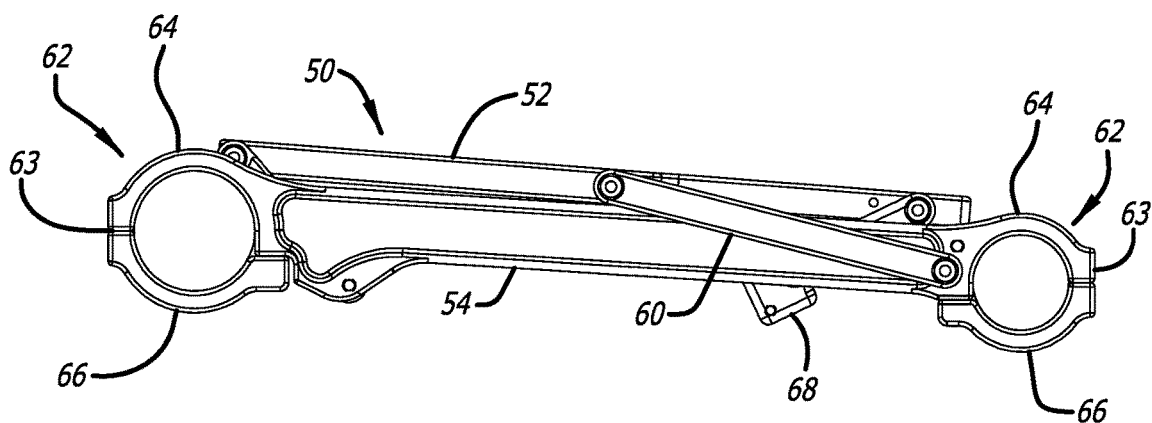
FIG. 5 illustrates a left elevation side elevation view of the deployable seat bottom assembly of FIG. 2 with the deployable seat bottom assembly in a fully stowed configuration.

As shown in FIGS. 2-8 for purposes of illustration, an embodiment of the present invention resides in a seat bottom assembly 50 for an aircraft passenger seat 200. The seat bottom assembly 50 is movable between stowed and deployed configurations. The assembly 50 includes a seat pan plate 52, a pair of beam braces 54, a pair of aft or rear scissor levers or links 56, a pair of front levers or links 58, and a pair of stabilizer levers or links 60. The seat pan plate 52, beam braces 54, links 56, links 58, and links 60 are each configured to move between respective stowed and deployed positions. Each beam brace 54 includes a bream brace retainer 62 on each end of the beam brace 54. Each beam brace retainer 62 is configured to engage a portion of existing structure 202 (e.g., cross-beams) of the seat frame of the seat 200. For example, as seen in FIG. 4, the beam brace retainers 62 engage the existing tubular-shaped structures 202 of the seat frame of the seat 200. Various components of the seat bottom assembly 50 including, but not limited to, the seat pan plate 52, beam braces 54, links 56, links 58, and links 60 can be made from various materials including, but not limited to, aluminum or composite materials. Mechanical fasteners 78 of various sizes and styles (e.g., bolts, screws, nuts, washers, etc.) can be used to secure the links 56, links 58, and links 60 to the seat pan plate 52, beam braces 54.

FIG. 2 illustrates two (2) passenger seats 200 (seen in broken lines) with each passenger seat 200 incorporating a deployable seat bottom assembly 50 (in a stowed configuration). The left and right passenger seats 200 are occupied by passengers 22 (shown in broken lines) with each seatback 206 in an upright position. The difference (D1) in height of the hips and knees (as represented by the circles) of the passenger in the right passenger seat 200 is shown when the deployable seat bottom assembly 50 is in the stowed configuration. FIG. 3 illustrates those same two (2) passenger seats 200 (seen in broken lines) but the passenger 22 (shown in broken lines) in the right passenger seat 200 has moved the deployable seat bottom assembly 50 to a deployed configuration with their seatback 206 in a reclined position. The difference (D2) in height of the hips and knees (as represented by the circles) of the passenger in the right passenger seat 200 is shown when the deployable seat bottom assembly 50 is in the deployed configuration. As seen in FIG. 3, the passenger 22 is able to extend their legs and lock their knees; providing great relief and allow proper circulation in addition to reducing the amount of stiffness typically seen on long flights.

The size and shape of the seat pan plate 52 varies as needed by a manufacturer of the seat 200, and can include a flat elongated shape (as shown) or can be customized for any size and shape desired. The seat pan plate 52 is generally angled at about five (5) degrees negative to horizontal (i.e., about −5 degrees) to about five (5) degrees positive to horizontal in the stowed position (preferably generally horizontal), and the seat pan plate 52 is generally pitched generally angled at about forty (40) degrees positive to horizontal to about fifty (50) degrees positive to horizontal in the deployed position (preferably at about forty five (45) degrees positive to horizontal). A seat cushion is disposed on a top surface of the seat pan plate 52 and secured thereto when the deployable seat bottom assembly 50 is integrated into the passenger seat 200 for use.

The beam braces 54 fit any economy class seat and the size, length, and shape of the beam braces 54 adjusted. The spacing between the beam braces 54 can be adjusted so as to provide a variable spread between the beam braces 54 (e.g., the beam braces 54 can be custom-fitted to any passenger seat). One of the beam braces 54 is generally disposed laterally adjacent to a left side of the seat pan plate 52, and the other one of the beam braces 54 is generally disposed laterally adjacent to a right side of the seat pan plate 52. Each beam brace retainer 62 includes an adjustable clamp 63 configured to engage the structure 202 of the seat frame. The adjustable clamp 63 includes an upper clamp portion or bracket support portion 64 and a lower clamp portion 66. The upper clamp or upper bracket support portions 64 is structurally part of the beam brace 54 with the lower clamp portion 66 secured to the upper clamp or bracket support 64 by fasteners. In one example, the fasteners may be threaded and pass through aligned bores 65 of the upper clamp or bracket support 64 and the lower clamp 66. The clamping space can be sized and shaped to match or approximate the existing structure 202 of a seat frame of a passenger seat 200 and can be customized for each seat type. Alternatively, the clamping space can be adjustable (e.g., by loosening or tightening fasteners to increase or decrease the clamping space). In the alternative, the upper clamp or bracket support portion may be a separate component and attached to the beam brace 54. For example, as seen in FIG. 4, the upper bracket supports 64 and the lower clamp 66 of the beam brace retainers 62 are secured around the tubular-shaped structures 202 of the seat 200 with portions of the upper bracket supports 64 and the lower clamps 66 sized and shaped to generally match the size and shape of the tubular-shaped structures 202. For example, as seen in FIG. 4, the lower facing surfaces of the upper bracket supports 64 and the upper facing surfaces of the lower clamp 66 of the beam brace retainers 62 are curved and configured to generally match the shape of the structures 202 (e.g., the existing structure seen in FIG. 4 has a tubular-shape matched by the shape of the inner surfaces of the adjustable clamps 63) of the seat 200.

The rear scissor levers or links 56 operationally connect the beam braces 54 and the seat pan plate 52. Each rear scissor lever or link 56 is in the form of a linkage that include an upper link 68 rotatably connected to a side of the seat pan plate 52, and a lower link 70 rotatably connected to an inner side of the beam brace 54 at or near the rear beam brace retainer 62 on the same side of the seat bottom assembly 50 the upper link 68 is connected to. The links 68, 70 are rotatably connected to each other at distal ends of the links 68, 70 from where the links 68, 70 respectively engage the seat plan plate 52 and the beam brace 54. The distal ends of the links 68, 70 rotate about an axis of rotation 300. Each of the rear scissor levers or links 56 is disposed on an opposite side of the seat pan plate 52 from the other rear scissor lever or link 56. A cross bar 72 extends between the pairs of rear scissor levers or links 56, and is connected to each scissor lever or link 56 where the distal ends of the links 68, 70 are rotatably connected. Mechanical fasteners 78 of various sizes and styles (e.g., bolts, screws, nuts, washers, etc.) can be used to secure the cross bar 72 to the upper and lower links 68, 70 with the cross bar 72 moving with the links 68, 70 as the links 68, 70 rotate about the axis of rotation 300. In one example, the fastener 78 can be in the form of a shoulder screw and the shoulder tightens against the cross bar 72 creating a captive pivot for the links 68, 70 to rotate.

The front levers or links 58 operationally connect the beam braces 54 and the seat pan plate 52. Each front lever or link 58 includes an upper end rotatably connected to a side of the seat pan plate 52, and a lower end rotatably connected to the an inner side of the beam brace 54 at or near the front beam brace retainer 62 on the same side of the seat bottom assembly 50 the upper end of the link 58 is connected to. Each of the front levers or links 58 is disposed on an opposite side of the seat pan plate 52 from the other front lever or link 58.

The pair of stabilizer links 60 operationally connect the beam braces 54 and the seat pan plate 52. Each of the stabilizer links 60 is generally disposed on an opposite side of the seat pan plate 52 from the other stabilizer link 60. Each stabilizer lever or link 60 includes an upper end rotatably connected to a side of the seat pan plate 52, and a lower end rotatably connected to the beam brace 54 on the same side of the seat plan plate 52 the upper end of the stabilizer link 60 is connected to. The upper end of the stabilizer link 60 is disposed on the side of the seat pan plate 52 about halfway along the length of the side of the seat pan plate 52, and the lower end of the stabilizer link 60 is connected on an outer side of the beam brace 54 at or near the rear beam brace retainer 62. The rotatable engagement of the links 56, 58, 60 with the seat pan plate 52 and beam braces 54 enables the seat bottom assembly 50 to move between stowed and deployed configurations. The lift and aft throw of the seat bottom assembly 50 are fully customizable.

Figure 6:
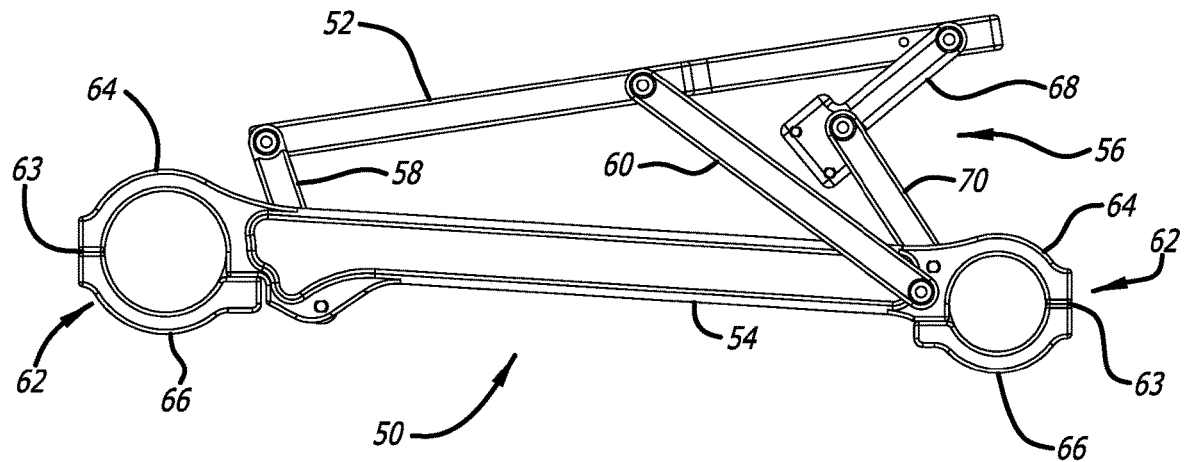
FIG. 6 illustrates a left elevation side elevation view of the deployable seat bottom assembly of FIG. 2 with the deployable seat bottom assembly in a partially deployed configuration.
Figure 7:
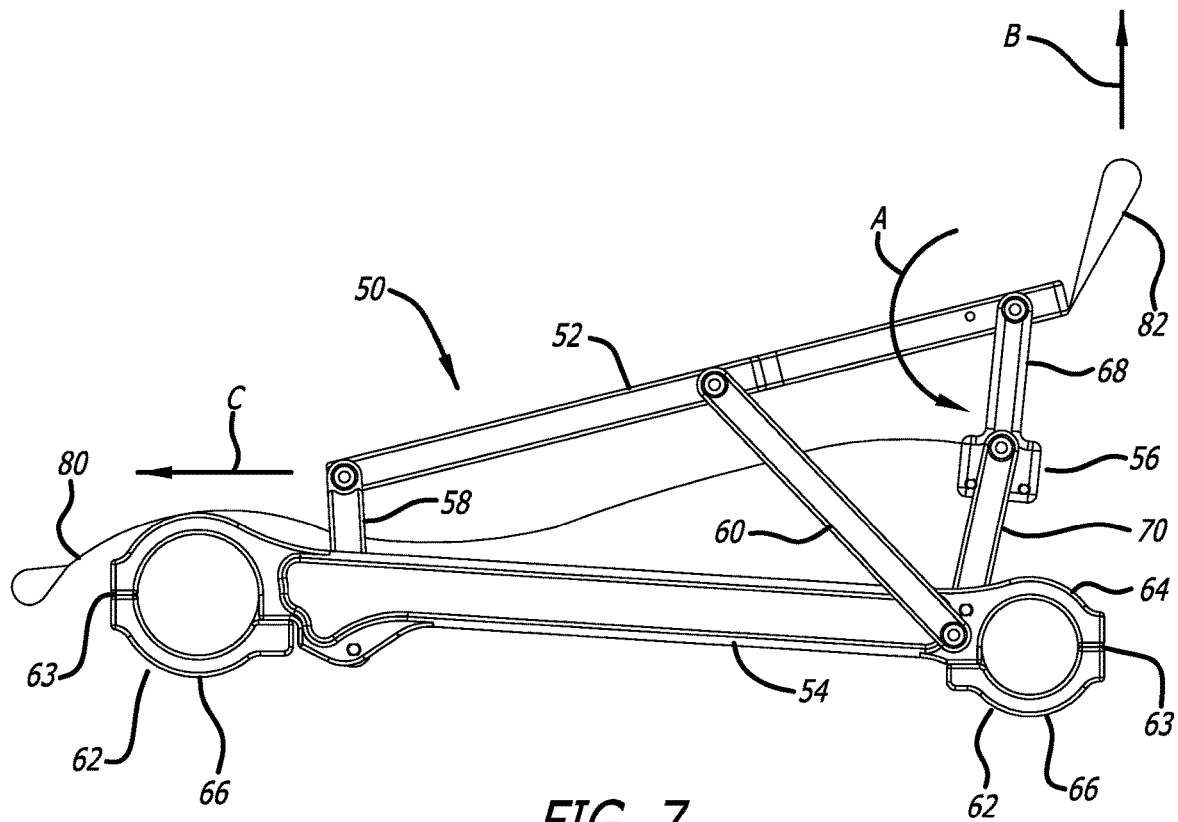
FIG. 7 illustrates a left elevation side elevation view of the deployable seat bottom assembly of FIG. 2 with the deployable seat bottom assembly in a fully deployed configuration.
Figure 8:
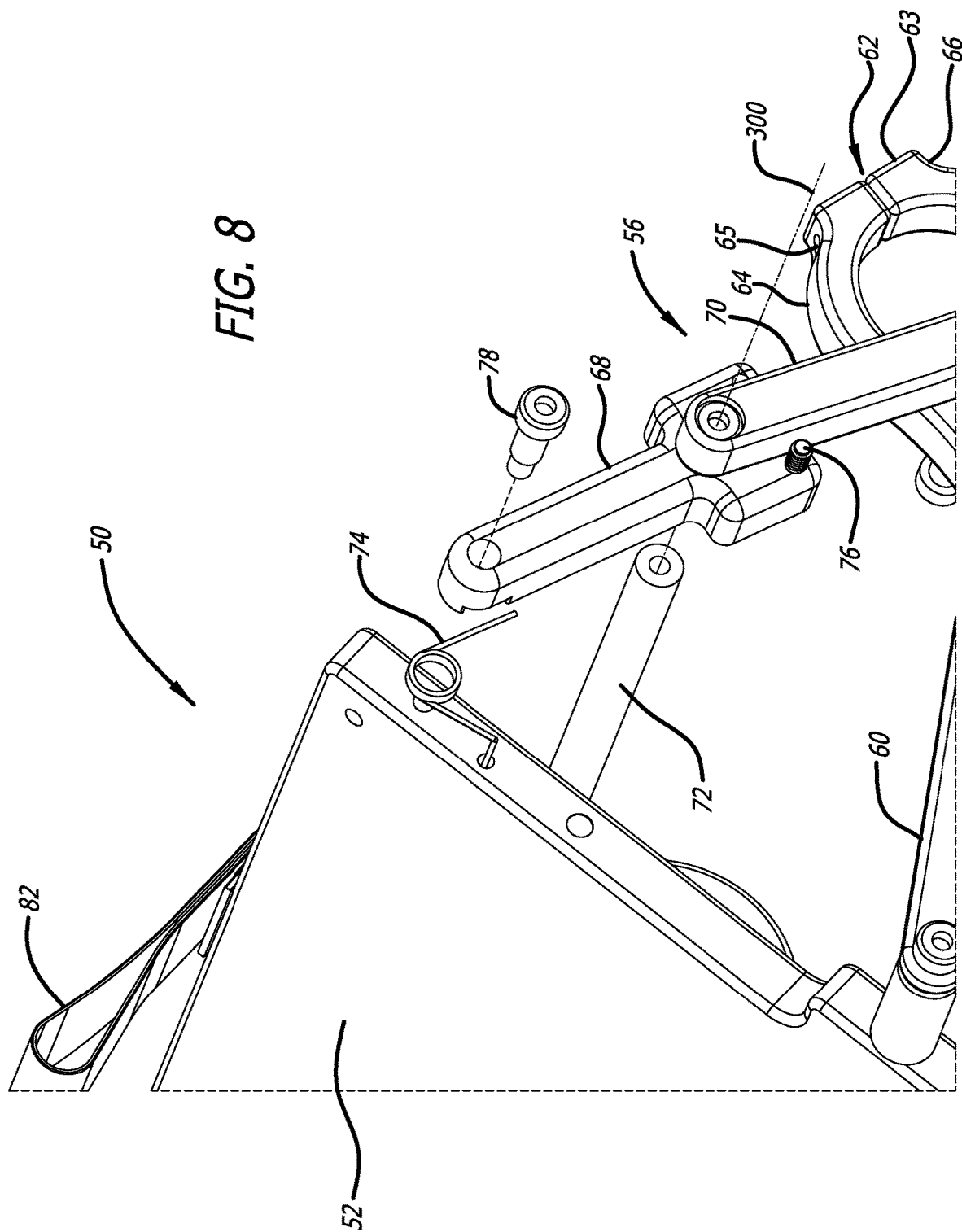
FIG. 8 illustrates an exploded partial perspective view of a rear left portion of the deployable seat bottom assembly of FIG. 2 with the deployable seat bottom assembly in a fully deployed configuration.

The assembly 50 further includes a biasing mechanism 74 configured to automatically bias the seat pan plate 52 from its stowed position to its deployed position. For example, at least one (if not both) of the rear scissor levers or links 56 can be configured to automatically bias the seat pan plate 52 from the stowed position to the deployed position. The biasing mechanism 74 can come in various forms including, without limitation, a torsion spring 74 disposed between each upper link 68 of the scissor lever 56 and the side of the seat pan plate 52 where that upper link 68 is rotatably connected to the seat pan plate 52. The torsion spring 74 may be partially disposed within the upper link 68. In the alternative, the biasing mechanism 74 can be in the form of magnets, compression springs, leaf springs, or the like. An end of the torsion spring 74 is connected to the upper link 68 and another end of the torsion spring 74 is connected to the seat pan plate 52. The spring force of each torsion spring ranges from one (1) inch pound to three (3) inch pounds to move the assembly 50 from the stowed configuration to the deployed configuration, and bias rotation of the distal ends of the upper and lower links 68, 70 towards the rear of the seat bottom assembly 50 (in the direction indicated by Arrow A as seen in FIGS. 6 & 7, which appears to be a counterclockwise direction when viewed from the side of the assembly 50 seen in FIGS. 6 & 7, and would appear to be a clockwise direction if viewed from the opposite side of the assembly 50). At least one of the rear scissor levers or links 56 include an outwardly extending stop 76 configured to prevent movement of the links 56 in one direction (e.g., the direction indicated by Arrow A as seen in FIGS. 6 & 7). The outwardly extending stop 76 is disposed on the distal end of at least one, if not both, of the upper links 68.

The rotation of the distal ends of the upper and lower links 68, 70 of each scissor lever or link 56 about the axis of rotation 300 is limited by the stop 76. The torsion spring 74 biases the lower link 70 towards the stop 76, and engagement of the stop 76 and a side of the lower link 70 prevents further rotation of the links 68, 70 about the axis of rotation 300. Because the stop 76 goes past center when the seat bottom assembly 50 is in the deployed configuration, when a load is placed on the seat pan plate 52 (e.g., a passenger sitting on a seat bottom cushion disposed above the seat pan plate 52), the seat bottom assembly 50 does not collapse back to the stowed configuration. If the links 68, 70 are directly in line and pressure is applied to the seat pan plate 52, the seat pan plate 52 will remain upright. If the links 68, 70 are biased in the forward direction, the seat pan plate 52 will move to the stowed position. If the links 68, 70 are biased aft, they will move towards the stops 76 and the seat pan plate 52 will remain in the deployed position resting against the stops 76.

The seat bottom assembly 50 also includes a front pull tab 80 and a rear pull tab 82. The front pull tab 80 is operationally connected to the front links 58, and configured to pull the seat pan plate 52 towards the stowed position of the seat pan plate 52 (and the stowed configuration of the assembly 50) when acted upon by a user. The rear pull tab 82 is operationally connected to the rear side of the seat pan plate 52, and configured to pull the seat pan plate 52 towards the deployed position of the seat pan plate 52 (and the deployed configuration of the assembly 50) when acted upon by a user pulling the rear pull tab 82 upwards (in the direction of Arrow B), even at an angle off-center from vertical. The rear pull tab 82 is generally in the form of an elongated strap having a looped portion on one end with a distal end of the strap directly connected to a rear side of the seat pan plate 52 at generally a mid-point of the rear side of the seat pan plate 52. The front pull tab 80 is generally in the form of an elongated strap having a looped portion on one end with a distal end directly connected to the cross bar 72 at generally a mid-point of the cross bar 72. The pull tabs 80, 82 can be made from various materials including, but not limited to, leather, plastic, metal (e.g., aluminum), etc. The front pull tab 80 is operationally connected to the cross bar 72, and configured to pull the cross bar 72 towards the front of the assembly 50 (and towards the stowed configuration of the assembly 50) when acted upon by a user pulling the front pull tab 80 away from the assembly 50 (in the direction of Arrow C) which, in turn, causes the rear scissor levers or links 56 to start rotating towards the stowed positions of the rear scissor levers or links 56. The length of the rear pull tab 82 is shorter than the length of the front pull tab 80 as, in operation, the length of the front pull tab 80 extends from connection to the cross bar 72 (which is generally disposed towards a rear of the seat bottom assembly 50) with a length of the strap extending under the seat pan plate 52 with the looped portion of the front pull tab 80 being generally disposed forward of a front of the seat bottom assembly 50. In contrast, the length of the strap of the rear pull tab 82 extends only a short distance beyond the looped portion of the rear pull tab 82 to engage the seat pan plate 52. The looped portions of the front and rear tabs 80, 82 are looped in order to facilitate a user being able to pull on the front and rear tabs 80, 82 in order to initiate moving the seat bottom assembly 50 between stowed and deployed configurations.

Figure 9:
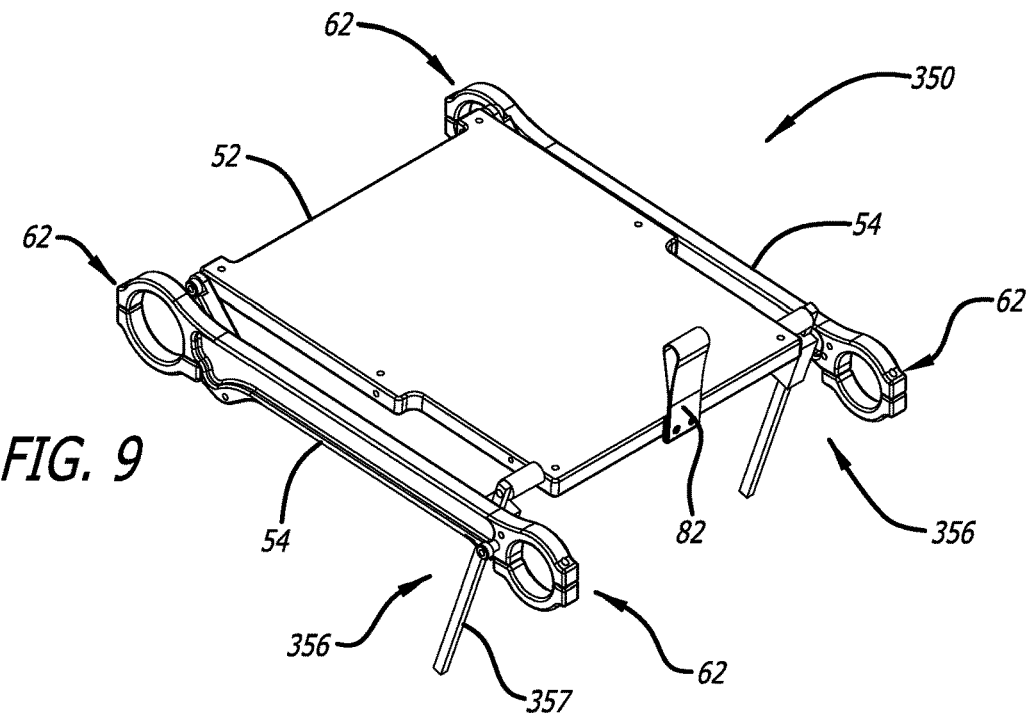
FIG. 9 illustrates a rear left perspective view of a deployable seat bottom assembly in accordance with another illustrative embodiment of the present invention, with the deployable seat bottom assembly in a fully stowed configuration.
Figure 10:
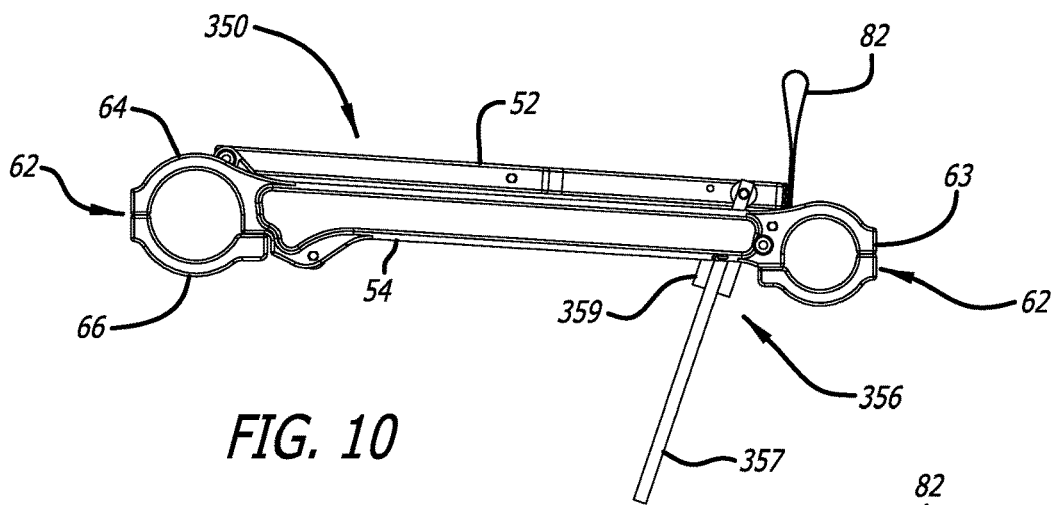
FIG. 10 illustrates a left elevation side view of the deployable seat bottom assembly of FIG. 9, with the deployable seat bottom assembly in a fully stowed configuration.
Figure 11:
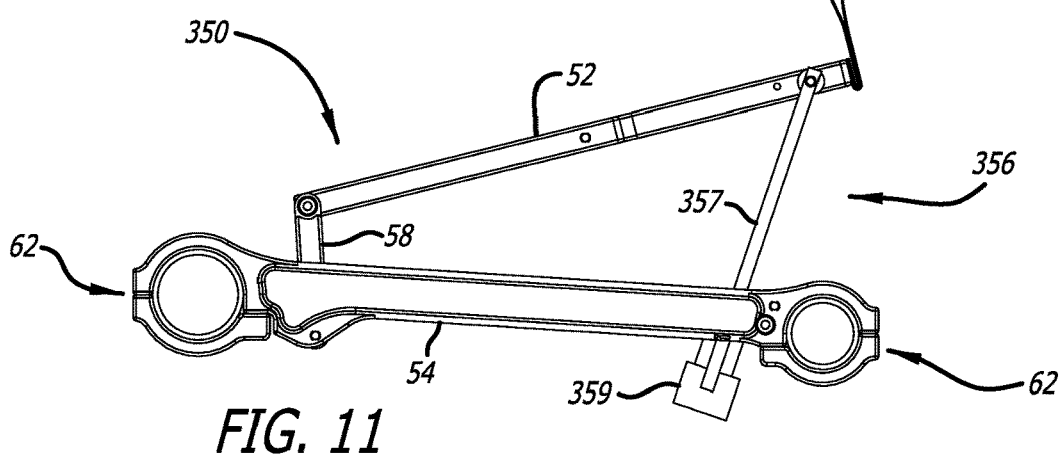
FIG. 11 illustrates a left elevation side view of the deployable seat bottom assembly of FIG. 9, with the deployable seat bottom assembly in a fully deployed configuration.

In accordance with an additional embodiment of the invention, a deployable seat bottom assembly 350 is illustrated in FIGS. 9-11. The assembly 350 has many similar, if not identical, features as described above in reference to the assembly 50, except that the assembly 350 describes an embodiment where, for example, a rail guide assembly 356 is used instead of the rear scissor levers or links 56. The rail guide assembly 356 includes a rail 357 rotatably connected to a side of the seat pan plate 52, and a rail guide 359 rotatably connected to a side of the beam brace 54. The rail 357 slidingly engages the rail guide 359 as the rail guide assembly 356 moves between stowed and deployed positions.

Figure 12:
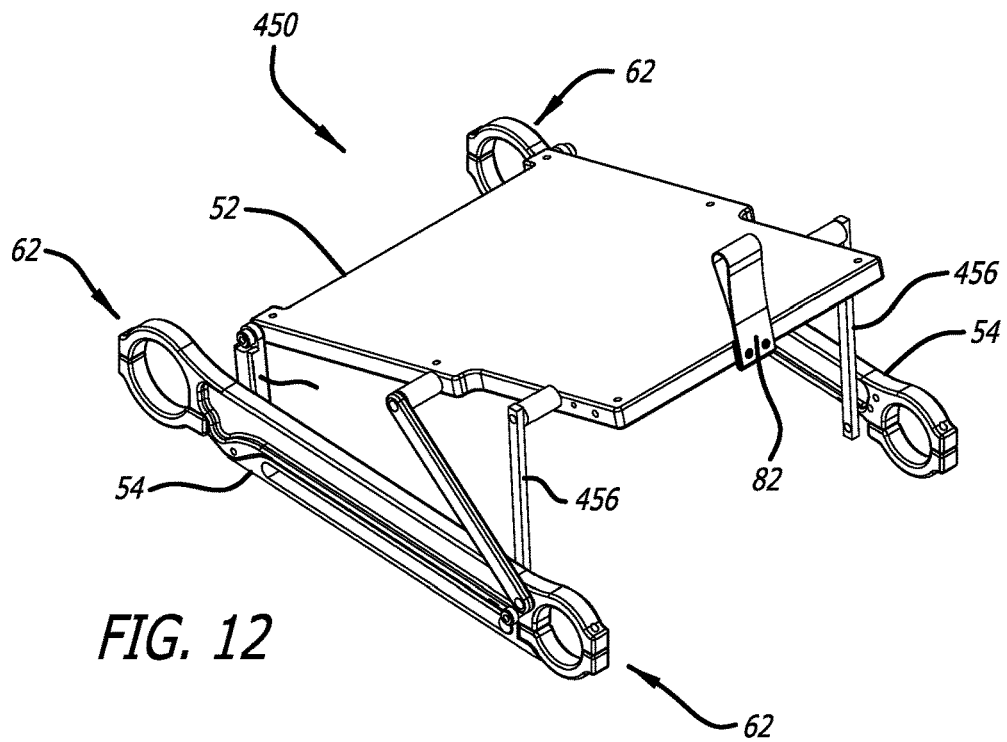
FIG. 12 illustrates a rear left perspective view of a deployable seat bottom assembly in accordance with still another illustrative embodiment of the present invention, with the deployable seat bottom assembly in a fully stowed configuration.
Figure 13:
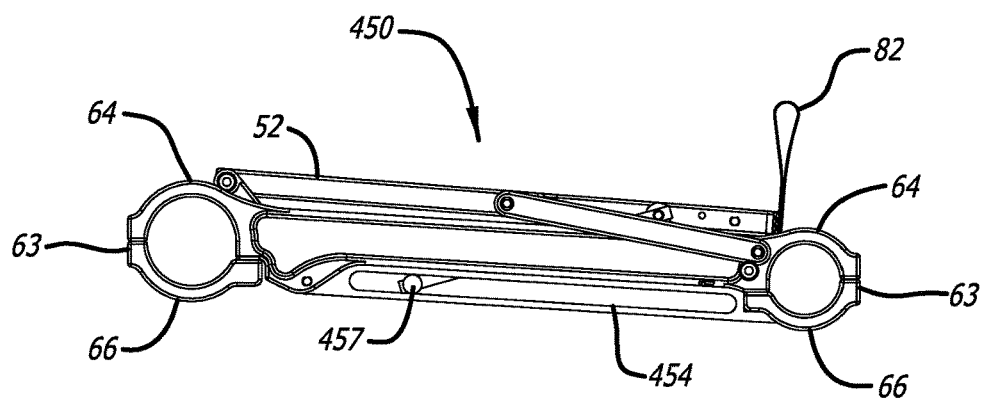
FIG. 13 illustrates a left elevation side view of the deployable seat bottom assembly of FIG. 12, with the deployable seat bottom assembly in a fully stowed configuration.
Figure 14:
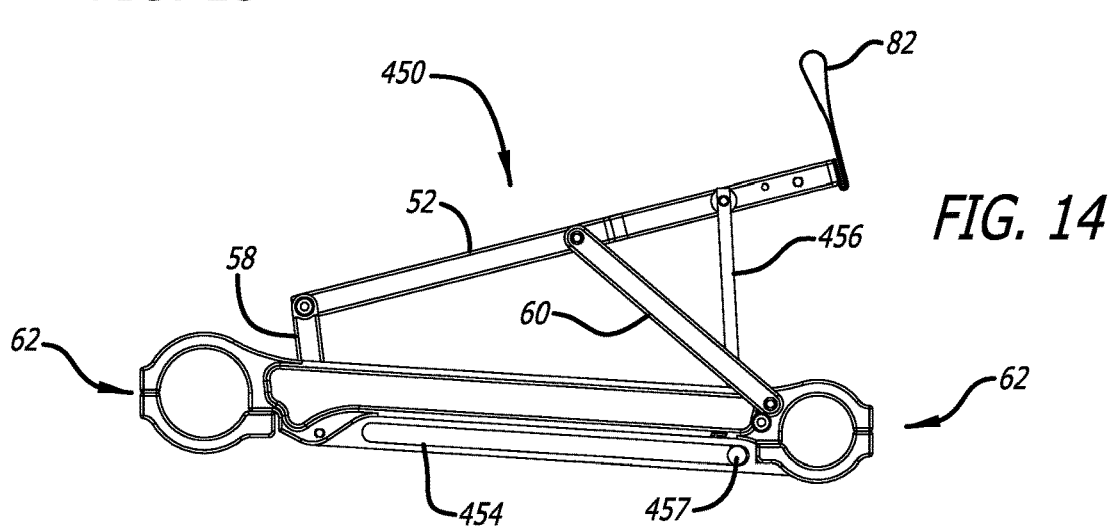
FIG. 14 illustrates a left elevation side view of the deployable seat bottom assembly of FIG. 12, with the deployable seat bottom assembly in a fully deployed configuration.

In accordance with an additional embodiment of the invention, a deployable seat bottom assembly 450 is illustrated in FIGS. 12-14. The assembly 450 has many similar, if not identical, features as described above in reference to the assemblies 50, 350, except that the assembly 450 describes an embodiment where, for example, rear levers or links 456 are used instead of the rear scissor levers or links 56. Each rear lever or link 456 is rotatably connected to a side of the seat pan plate 52 at or near one end of the rear lever or link 456. Each rear lever or link 456 includes a pin 457 extending outwardly from the rear lever or link 456 at or near the other end of the rear lever or link 456 (i.e., the end of the rear lever or link 456 opposite from the end engaging the seat pan plate 52) such that the rear levers or links 456 are configured to slidingly engage the beam braces 54. Each beam brace 54 includes a slot 454 extending through the beam brace 54 along a length of the beam brace 54 between the beam brace retainers 62. The pin 457 of each rear lever or link 456 slidingly engages a respective slot 454 in one of the beam braces 54 as the rear levers or links 456 move between stowed and deployed positions.

Figure 15:
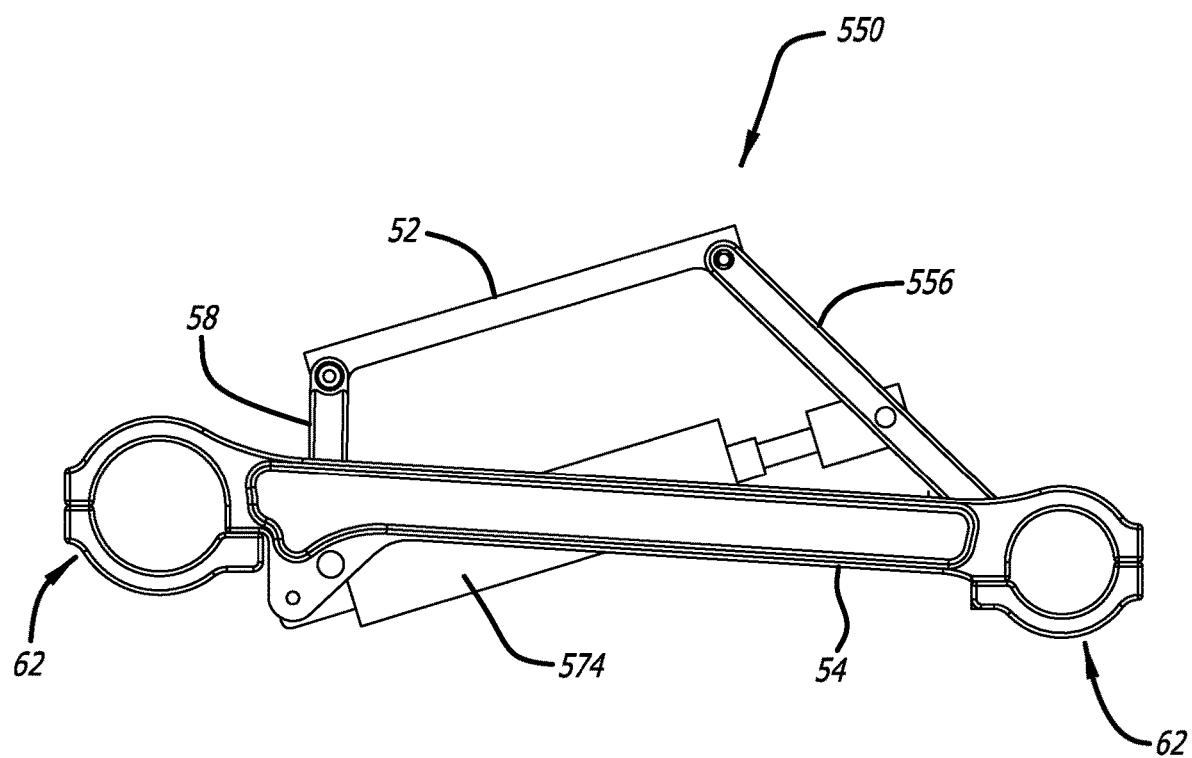
FIG. 15 illustrates a left elevation side view of a deployable seat bottom assembly in accordance with a further illustrative embodiment of the present invention, with the deployable seat bottom assembly in a fully deployed configuration.

In accordance with an additional embodiment of the invention, a deployable seat bottom assembly 550 is illustrated in FIG. 15. The assembly 550 has many similar, if not identical, features as described above in reference to the assemblies 50, 350, 450, except that the assembly 550 describes an embodiment where, for example, a gas locking spring 574 is configured to automatically bias the seat pan plate 52 from the stowed position to the deployed position. Rear levers or links 556 are used instead of the rear scissor levers or links 56. Each rear lever or link 556 is rotatably connected to an outer side of the seat pan plate 52 at or near one end of the rear lever or link 556, and rotatably connected to an inner side of the beam brace 54 at or near the other end of the rear lever or link 556. The assembly gas locking spring 574 has first and second ends, with the gas locking spring 574 operationally connected to the rear links 556 at or near the first end of the gas locking spring 574, and operationally connected to the beam braces 54 at or near the second end of the gas locking spring 574. The gas locking spring 574 provides about 10-20 pounds of force to move the assembly 50 from the stowed to deployed configurations. The gas locking spring 574 can be similar to a hydraulic seat recline device manufactured by Crane Co. under the HYDROLOK brand. When the assembly 550 is integrated into a passenger seat 200, the assembly 550 can be moved system can be operated with a standard recline button (i.e., the button used to move the seatback between upright and reclined positions) allowing the passenger to deploy the seat pan plate 52 with a push of a button (the passenger must not be seated) and stowage can take place with the passenger seated. For example, as an option when the passenger seat is used with the assembly 550, the seat bottom (e.g., the cushion disposed over the seat pan plate 52 and secured thereto) could start in the up and aft position. This would provide approximately 2 inches of additional row space that can be gained for passenger boarding (which includes the passenger making their way past the other seats in their row and seating themselves in their seat) and passenger egress (which includes the passenger leaving their seat and making their way past the other seats in their row). When the seatback is upright, the seat bottom is free to move up and down but is held in the up (i.e., deployed) position by spring force but is not locked. One the passenger boards, is seated, and reclines, the seat bottom will stay down. With the seatback reclined, the seat bottom can be adjusted to suit and will stay in position. When the passenger puts the seatback in the upright position and stands up, the seat bottom returns to the up and aft position.

In accordance with a still further embodiment of the invention, a deployable seat bottom assembly 650 is illustrated in FIGS. 16-17. The assembly 650 has many similar, if not identical, features as described above in reference to the assemblies 50, 350, 450, 550, except that the assembly 650 does not include beam braces 54, and provides an embodiment where the assembly 650 is attachable to a seat frame 202 as a single assembly with four (4) separate adjustable clamps 63 providing independent mountings to the seat frame 202. That is, each adjustable clamp 63 is configured to engage the structure 202 of the seat frame. The adjustable clamp 63 includes an upper clamp portion or bracket support portion 64 and a lower clamp portion 66. Each rear scissor lever or link 56 and each front lever or link 58 is directly connected to an adjustable clamp 63. Each stabilizer lever or link 60 is rotatably connected to the seat pan plate 52 on one end and rotatably connected to an adjustable clamp 63 on the other end.

Figure 18:
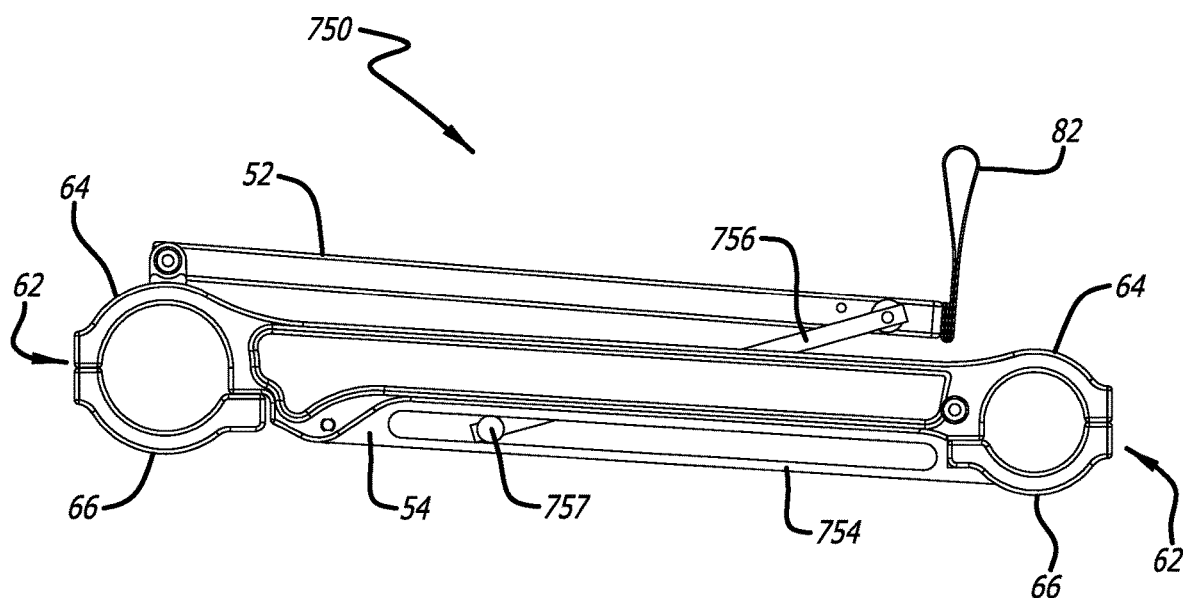
FIG. 18 illustrates a left elevation side view of a deployable seat bottom assembly in accordance with a yet further illustrative embodiment of the present invention, with the deployable seat bottom assembly in a fully stowed configuration.
Figure 19:
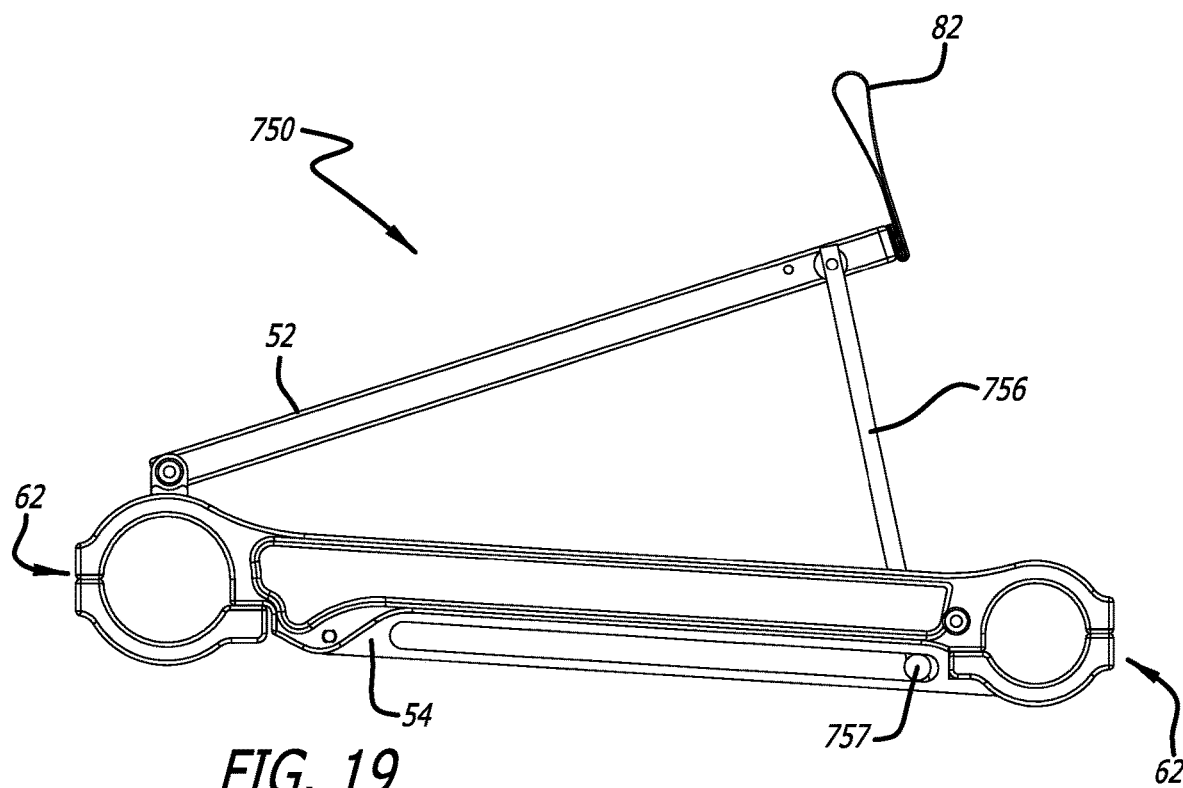
FIG. 19 illustrates a left elevation side view of the deployable seat bottom assembly of FIG. 18, with the deployable seat bottom assembly in a fully deployed configuration.

In accordance with a still further embodiment of the invention, a deployable seat bottom assembly 750 is illustrated in FIGS. 18-19. The assembly 750 has many similar, if not identical, features as described above in reference to the assemblies 50, 350, 450, 550, 650 except that the assembly 750 only pivots in the front and does not move backwards as the assembly 750 describes an embodiment where, for example, rear levers or links 756 are used instead of the rear scissor levers or links 56. Each rear lever or link 756 is rotatably connected to a side of the seat pan plate 52 at or near one end of the rear lever or link 756. Each rear lever or link 756 includes a pin 757 extending outwardly from the rear lever or link 756 at or near the other end of the rear lever or link 756 (i.e., the end of the rear lever or link 756 opposite from the end engaging the seat pan plate 52) such that the rear levers or links 756 are configured to slidingly engage the beam braces 54. Each beam brace 54 includes a slot 754 extending through the beam brace 54 along a length of the beam brace 54 between the beam brace retainers 62. The pin 757 of each rear lever or link 756 slidingly engages a respective slot 754 in one of the beam braces 54 as the rear levers or links 756 move between stowed and deployed positions. The front of the seat pan plate 52 is rotatably connected at the front of the assembly 750 to each of the beam braces 54.

In use, the deployment stages required to bring the seat bottom assembly (e.g., seat bottom assembly 50) to a position conducive to a passenger being able to extend and stretch their legs are as follows: stowed configuration, semi-deployed configuration, and deployed configuration. In the stowed configuration (see, for example, FIG. 3), the deployable seat bottom assembly 50 engages the seat frame 202 of the passenger seat 200. In any event, in the stowed configuration, the seat bottom assembly 50 is generally out of sight of passengers 22 as a seat cushion 204 of the passenger seat 200 is generally disposed on top of the seat pan plate 52 and secured thereto. The only portions of the seat bottom assembly 50 generally visible to passengers are the front and rear pull tabs 80, 82. The rear pull tab 82 will extend upwardly from a space between a back side of the seat cushion 204 and a side of a cushion of the seatback 206 against which the passenger's back rests. To a passenger 22, the front pull tab 80 appears to extend forward of the seat cushion 204 from under the passenger seat 200. The passenger 22 lifts themselves off (at least in part) from the seat cushion 204 (i.e., the passengers takes at least the bulk of their weight off the seat cushion 204 and underlying seat pan plate 52) and pulls the rear pull tab 82 upwards which starts the assembly 50 moving from the stowed configuration towards the deployed configuration. The passenger's seatback 206 can be in either the upright or reclined position. Pulling on the rear pull tab 82 by the passenger 22 will pull on the seat pan plate 52, which in turn causes the rear scissor levers or links 56 to pivot from their stowed position to their deployed position (as well as causing the stabilizer links 60 and front links 58 to pivot from their stowed position to their deployed position). The biasing mechanism 74 (e.g., torsion springs) applies force (in the direction of Arrow A) to the rear scissor levers or links 56 moving the rear scissor levers or links 56 from their stowed position towards their deployed position, with the seat plate pan 52 also moving from its stowed position towards its deployed position.

In the semi-deployed configuration, the passenger 22 may still be pulling on the rear pull tab 82 as the torsion springs 74 continue to apply force to the rear scissor levers or links 56 moving the rear scissor levers or links 56 from their stowed position towards their deployed position, with the seat pan plate 52 continuing to move from its stowed position towards its deployed position. Once the seat pan plate 52 gets near the fully deployed position, the torsion springs 74 assist in taking the seat pan plate 52 to the fully deployed position and help keep the seat pan plate 52 in the fully deployed position.

The assembly 50 reaches the deployed configuration when the torsion spring 74 has biased the lower link 70 towards the stop 76 such that engagement of the stop 76 and a side of the lower link 70 prevents further rotation of the links 68, 70 about the axis of rotation 300. Because the stop 76 goes past center when the seat bottom assembly 50 is in the deployed configuration, when a load (e.g., a portion of the passenger's body) is placed on top of the seat pan plate 52 (e.g., a passenger 22 sitting on a seat bottom cushion 204 disposed above the seat pan plate 52 and secured thereto), the seat bottom assembly 50 does not collapse back to the stowed configuration. As seen in FIG. 3, with the assembly 50 in the deployed configuration, a seated passenger 22 has the ability to fully extend their legs. In its deployed position, the seat pan plate 52 has not only pivoted upward, but has also simultaneously slid back, and made room for the passenger's knees. Giving the passenger 22 the option to temporarily place and lock the seat pan plate 52 in the deployed position will allow the passenger 22 to get much needed relief without having to exit the passenger seat 200. With this configuration, passengers 22 can vary their seating position and thereby promote proper circulation and comfort (even in an economy class seat).

When a passenger 22 wishes to move the assembly 50 from the deployed configuration to the stowed configuration, the passenger 22 pulls the front pull tab 80 forward (i.e., in the direction of Arrow C (e.g., in the direction of the seatback 206 of the passenger seat 200 in front of the passenger's seat 200)). As the distal end of the front pull tab 80 is connected to the cross bar 72, pulling on the front pull tab 80 in turn pulls the cross bar 72 in a forward direction. At the cross bar 72 is connected to the scissor levers or links 56, movement of the cross bar 72 in a forward direction (e.g., in the direction of Arrow C) causes the scissor levers or links 56 to start pivoting away from engagement with the stops 76 and towards the stowed positions of the scissor levers or links 56. The passenger 22 needs to pull the front pull tab 80 with enough force to overcome the torsional force provided by the torsion springs 74. The user need not press down on the rear portion of the seat cushion 204 over the seat pan plate 52 in order to collapse the assembly 50 towards its stowed configuration as pulling the front pull tab 80 forward is enough to bring the assembly to its stowed configuration. However, the passenger 22 may continue to sit in their seat while pulling the front pull tab 80 forward of their seat 200. When the assembly 50 is in its stowed configuration, the torsional force of the torsion springs 74 is insufficient to move the assembly 50 back towards its deployed configuration. Various methods can be used to dampen movement of the assembly 50 towards the stowed configuration. For example, one-way bearings can be used to keep the assembly 50 from moving too quickly towards the stowed configuration. The one-way bearings would allow free movement in the direction of deployment but would create friction to slow down stowage.

In another alternative, the assemblies 50, 350, 450, 550 can be configured for use with a translating seat pan. In yet another alternative, the assemblies 50, 350, 450, 550 can be integrated into a passenger seat 200 such that the assemblies 50, 350, 450, 550 can be operated to move between deployed and stowed configurations using a standard recline button (i.e., the button used to move the seatback between upright and reclined positions) that allows the passenger to deploy the assemblies 50, 350, 450, 550 with a push of a button.

Embodiments of the present invention can be incorporated into new passenger seats or retro-fitted into existing passenger seats (e.g., passenger seats already installed in passenger aircraft). Although the present invention has been discussed above in connection with use on a passenger aircraft, the present invention is not limited to that environment and may also be used on passenger trains, cars, buses and other vehicles including, but not limited to, carts, carriages, and means of transportation mounted on rails.

Furthermore, the present invention is not limited to use with airline seats, and may be used with a wide variety of other seating associated with various types of vehicles (e.g., trucks, buses, trains, etc.). Likewise, the present invention is also not to be limited to use in vehicles and may be used in non-vehicle or stationary environments where there is seating, and it is desirable to stow and deploy seating, such as entertainment venues (e.g., theaters, sports/concert arenas, etc.), auditoriums, restrooms, sports stadiums, film sets, schools, hospitals, factories, garages, offices, shipyards, construction sites and the like. Furthermore, the present invention is also not to be limited to use in connection with seating, and may be used in any environment where the apparatus may be stowed within and deployed in the manner as described above.

In addition, the claimed invention is not limited in size and may be constructed in various sizes in which the same or similar principles of operation as described above would apply. Furthermore, the figures (and various components shown therein) of the specification are not to be construed as drawn to scale.

The terminology used herein is for the purpose of describing particular example embodiments only and is not intended to be limiting. As used herein, the singular forms "a", "an" and "the" may be intended to include the plural forms as well, unless the context clearly indicates otherwise. In other words, an element or step recited in the singular and preceded by the word "a" or "an" should be understood as not necessarily excluding the plural of the elements or steps. Further, references to "one embodiment" or "one implementation" are not intended to be interpreted as excluding the existence of additional embodiments or implementations that also incorporate the recited features.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps. In other words, unless explicitly stated to the contrary, embodiments "comprising" or "having" an element or a plurality of elements having a particular property can include additional elements not having that property. In other words, the terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. In other words, the use of "including," "comprising," "having," "containing," "involving," and variations thereof, is meant to encompass the items listed thereafter and additional items. Further, references to "one embodiment" or "one implementation" are not intended to be interpreted as excluding the existence of additional embodiments or implementations that also incorporate the recited features. The term "exemplary" is intended to mean "an example of".

When introducing elements of aspects of the disclosure or the examples thereof, the articles "a," "an," "the," and "said" are intended to mean that there are one or more of the elements. In other words, the indefinite articles "a", "an", "the", and "said" as used in the specification and in the claims, unless clearly indicated to the contrary, should be understood to mean "at least one." The use of the expression "at least" or "at least one" suggests the use of one or more elements or ingredients or quantities, as the use may be in the embodiment of the disclosure to achieve one or more of the desired objects or results.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary. Any range or value given herein can be extended or altered without losing the effect sought, as will be apparent to the skilled person.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

While various spatial and directional terms, such as "top," "bottom," "upper," "lower," "vertical," and the like are used to describe embodiments and implementations of the present disclosure, it is understood that such terms are merely used with respect to the orientations shown in the drawings. The orientations can be inverted, rotated, or otherwise changed, such that a top side becomes a bottom side if the structure is flipped 180 degrees, becomes a left side or a right side if the structure is pivoted 90°, and the like. In other words, spatially relative terms, such as "front," "rear," "left," "right," "inner," "outer," "beneath", "below", "lower", "above", "upper", "horizontal", "vertical", "lateral", "longitudinal" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above can relate to one embodiment or can relate to several embodiments. The embodiments are not limited to those that solve any or all of the stated problems or those that have any or all of the stated benefits and advantages. It will further be understood that reference to 'an' item refers to one or more of those items.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation (e.g., different steps, etc.) is within the scope of aspects and implementations of the disclosure. In other words, the method steps, processes, and operations described herein are not to be construed as necessarily requiring their performance in the particular order discussed or illustrated, unless specifically identified as an order of performance. It is also to be understood that additional or alternative steps may be employed.

The phrase "one or more of the following: A, B, and C" means "at least one of A and/or at least one of B and/or at least one of C." The phrase "and/or", as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As briefly discussed above, as used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person of ordinary skill in the art to practice the various embodiments of the disclosure, including making and using any devices or systems and performing any incorporated methods. The patentable scope of the various embodiments of the disclosure is defined by the claims, and can include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. Moreover, features described in connection with one embodiment of the invention may be used in conjunction with other embodiments, even if not explicitly stated above. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

The following claims are thus to be understood to include what is specifically illustrated and described above, what is conceptually equivalent, what can be obviously substituted and also what essentially incorporates the essential idea of the invention. Those skilled in the art will appreciate that various adaptations and modifications of the just-described preferred embodiment can be configured without departing from the scope of the invention. The illustrated embodiment has been set forth only for the purposes of example and that should not be taken as limiting the invention. Therefore, it is to be understood that, within the scope of the appended claims, the invention may be practiced other than as specifically described herein.

What is claimed is:

1. A seat bottom assembly movable between stowed and deployed configurations, comprising:
    a seat pan plate having a front side, a rear side, a left side, a right side, a top surface, and a bottom surface; wherein the seat pan plate is configured to move between stowed and deployed positions;
    a pair of beam braces configured to directly engage laterally-oriented portions of a seat frame of a seat bottom portion of a seat, wherein the seat includes the seat bottom portion and a seat back portion, wherein the laterally-oriented portions are perpendicular to the beam braces, and wherein the seat bottom assembly moves between stowed and deployed configurations independent of the seat back portion of the seat;
    a pair of front links operationally connecting the beam braces and the seat pan plate; and
    a pair of rear links operationally connecting the beam braces and the seat pan plate;
    wherein each of the front links is disposed on an opposite side of the seat pan plate from the other front link; and wherein each of the rear links is disposed on an opposite side of the seat pan plate from the other rear link.

2. The assembly of claim 1, wherein each beam brace includes a beam brace retainer on each end of the beam brace, wherein each beam brace retainer is configured to engage a portion of the seat frame of the seat.

3. The assembly of claim 1, wherein each beam brace retainer comprises an adjustable clamp configured to engage the seat frame.

4. The assembly of claim 1, wherein at least one of the rear links includes a stop configured to prevent movement of the link in one direction.

5. The assembly of claim 1, wherein one of the beam braces is disposed laterally adjacent to a left side of the seat pan plate, and the other one of the beam braces is disposed laterally adjacent to a right side of the seat pan plate.

6. The assembly of claim 1, wherein the seat pan plate is generally angled at about −5 degrees to about 5 degrees in the stowed position, and the seat pan plate is generally pitched at about 40 degrees to about 50 degrees in the deployed position.

7. The assembly of claim 1, further comprising a front pull tab operationally connected to the rear links, and configured to pull the seat pan plate towards the stowed position when acted upon by a user.

8. The assembly of claim 1, further comprising a rear pull tab operationally connected to the rear side of the seat pan plate, and configured to pull the seat pan plate towards the deployed position when acted upon by a user.

9. The assembly of claim 1, further comprising a biasing mechanism configured to automatically bias the seat pan plate from the stowed position to the deployed position.

10. The assembly of claim 1, further comprising a pair of stabilizer links operationally connecting the beam braces and the seat pan plate; wherein each of the stabilizer links is disposed on an opposite side of the seat pan plate from the other stabilizer link.

11. The assembly of claim 1, wherein each rear link includes an upper link rotatably connected to a side of the seat pan plate, and a lower link rotatably connected to a side of the beam brace, wherein the upper and lower links are rotatably connected to each other at distal ends from where the upper and lower links respectively engage the seat plan plate and the beam brace, and wherein the assembly further comprises a cross bar connected the rear links and disposed therebetween.

12. The assembly of claim 11, wherein the distal end of at least one of the rear links includes a stop configured to prevent movement of that rear link in one direction.

13. The assembly of claim 1, wherein each rear link includes a rail rotatably connected to a side of the seat pan plate, and a rail guide rotatably connected to a side of the beam brace, wherein the rail slidingly engages the rail guide.

14. The assembly of claim 1, wherein each rear link includes a first end rotatably connected to a side of the seat pan plate, and a second end configured to slidingly engage a slot in the beam brace.

15. The assembly of claim 1, wherein at least one of the rear links is configured to automatically bias the seat pan plate from the stowed position to the deployed position.

16. The assembly of claim 1, further comprising a gas spring having first and second ends, wherein the gas spring is operationally connected to the rear links at or near the first end of the gas spring, and operationally connected to the beam braces at or near the second end of the gas spring, and wherein the gas spring is configured to automatically bias the seat pan plate from the stowed position to the deployed position.

17. A seat assembly, comprising:
    a seat; and
    a seat bottom assembly movable between stowed and deployed configurations, wherein the seat bottom assembly comprises a seat pan plate having a front side, a rear side, a left side, a right side, a top surface, and a bottom surface; wherein the seat pan plate is configured to move between stowed and deployed positions; a pair of beam braces configured to directly engage laterally-oriented portions of a seat frame of a seat bottom portion of a seat, wherein the seat includes the seat bottom portion and a seat back portion, wherein the laterally-oriented portions are perpendicular to the beam braces, and wherein the seat bottom assembly moves between stowed and deployed configurations independent of the seat back portion of the seat; a pair of front links operationally connecting the beam braces and the seat pan plate; and a pair of rear links operationally connecting the beam braces and the seat pan plate; wherein each of the front links is disposed on an opposite side of the seat pan plate from the other front link; and wherein each of the rear links is disposed on an opposite side of the seat pan plate from the other rear link.

* * * * *